Feb. 2, 1943.  W. A. HERRING ET AL  2,309,900
FAUCET VALVE
Filed Oct. 7, 1941
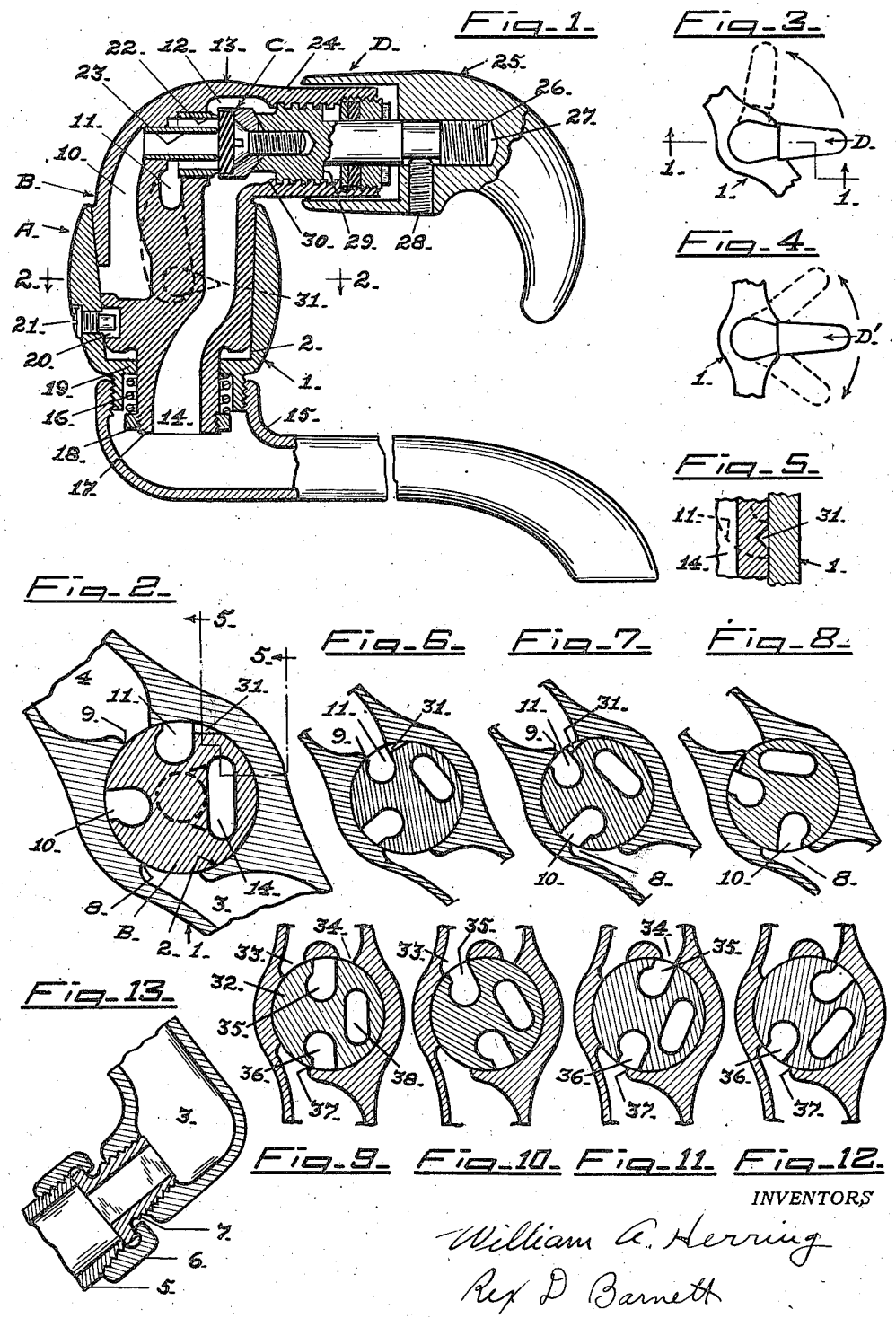
INVENTORS
William A. Herring
Rex D Barnett Patented Feb. 2, 1943

2,309,900

UNITED STATES PATENT OFFICE 2,309,900

FAUCET VALVE

William A. Herring and Rex D. Barnett, South Gate, Calif.

Application October 7, 1941, Serial No. 413,992

3 Claims. (Cl. 277—10)

This invention relates to an improved faucet valve and has for its primary object the provision of a faucet or mixer valve wherein the flow of a plurality of fluids therethrough is controlled so as to be available individually or as combined in variable ratios as well as be controlled in volume flow by the compound manipulation of a unit actuating means.

Another object of this invention is to provide a mixer valve wherein the flow of fluids therethrough, either as individualized or as a combined variant ratio flow is automatically moderated in transition for example, cold to hot water and vice versa, and controlled in volume by manipulation of a unit actuating means.

A further object is to provide a mixer valve wherein the compound manipulation of a unit means provides for a fixable ratio of combined fluid flow and a volitional volume flow or shut-off of the fixed combination flow desired.

A further object is to provide a mixer valve wherein closing of the means effecting discharge flow through the valve will automatically prevent the diffusion or by-passing of the respectively individualized fluid streams, the one into the other, no matter in what position of relative ratios for combined fluid flow; the valve is set for or inadvertently positioned to deliver.

A further object of this invention is to provide a faucet having a selector valve for controlling the admission of hot and cold water, a discharge valve for controlling the flow of liquid from the faucet, and a handle-operating means common to said valves and movable as a whole with the selector valve to set it for admitting hot water at a desired rate of flow, or cold water at a desired rate of flow, or a varied mixture of hot and cold water, and for shutting off admission of both liquids, and additionally movable in part either simultaneously with or before or subsequent to the setting of the selector valve, to effect the opening and closing of the discharge valve, whereby with an operation of the handle which will simultaneously effect the motions necessary to operate both valves, or with sequential movements of the handle (in either case without necessitating the removal of the hand of the operator from the handle) the faucet may be selectively operated to discharge hot water, cold water or a mixture thereof at a varied rate, and the discharge valve may be operated without disturbing the setting of the selector valve and vice versa.

With the above and other objects in view the invention consists in the novel method and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any advantages of the invention.

Referring to the drawing:

Figure 1 is a fragmentary vertical sectional view of a valve embodying this invention, and taken on the line 1—1 of Figure 3, Figure 2 is a fragmentary sectional view taken on the line 2—2 of Figure 1.

Figure 3 is a fragmentary top plan view of the valve shown in Figure 1 and indicating the manner of the moving of the valve handle.

Figure 4 is a fragmentary top plan view of a modified form of the invention wherein valve handle motion is different from that of the form of the invention shown in Figure 3.

Figure 5 is a fragmentary sectional view taken on the line 5—5 of Figure 2.

Figures 6, 7 and 8 are reduced fragmentary horizontal sectional views on line 2—2 of Figure 1 respectively showing the plug valve in three positions permitting the flow of one liquid exclusively, the simultaneous flow of the two liquids, and the flow of the other liquid exclusively.

Figures 9, 10, 11 and 12 are horizontal sectional views of the modified form shown in Figure 4 as taken on the plane of line 2—2 of Figure 1 and respectively showing the plug valve in closed position, position to permit the flow of one liquid only, position to permit the flow of both liquids simultaneously and position to permit flow of the other liquid only.

Figure 13 is a fragmentary sectional view showing one form of the fittings used to couple the valve body intakes with the supply lines.

As shown in the accompanying drawing one form of this invention is embodied in a faucet A which generally comprises a selector valve B for controlling the admission of hot and cold water or a mixture thereof into the faucet, a discharge valve C for controlling the discharge of liquid from the faucet, and a two parts handle-operating means D carried by the plug valve and movable as a whole to set the plug valve for admitting hot water, or cold water or a hot and cold mixture, and movable in part for opening and closing the discharge valve, it being possible to effect these handle movements simultaneously or sequentially and to regulate the rate of flow with either or both valves and to effect any or all of the aforesaid movements without requiring the removal of the hand of the operator from the handle.

As here provided the faucet A includes a body 1 having a conical bore 2 serving as a seat for the valve B which latter is of the plug type and hot and cold water intake passages 3 and 4, Figure 2, connected with sources of supply of hot and cold water not shown, but as for example connected by means of the fittings 5, 6 and 7 shown in Figure 13. These passages terminate in ports 8 and 9 opening into bore 2 of the body 1 as shown in Figures 1 and 2, for registration with hot and cold water ports 10 and 11 opening on the sides of the plug valve B. Ports 10 and 11 extend axially through the plug valve into a valve chamber 12 formed in a prolonger extension 13 of said valve. In this chamber the discharge valve C controls the flow therefrom into a discharge port 14 leading downwardly from the chamber through the lower end of the plug valve, as best shown in Figure 1, so as to discharge into an outlet or nozzle 15 screwed onto the lower end of the body 1 as shown in Figure 1.

A spring 16 surrounds the reduced lower end 17 of the plug valve B and is held under tension between an annular keeper 18 screwed on said reduced end and a flange 19 on the body whereby to effectively hold the plug valve seated. Rotative movement of the plug valve B in either direction relative to the body 1 for full-open registration of the ports 10 and 11 in the plug with the respective ports 8 and 9 of the body is limited by means of the circumferentially disposed slot 20, the respective arcuately spaced ends of which engage the stop-screw 21 in the body 1.

The chamber 12 is provided with a pair of tubular seat members 22 and 23 for the discharge valve C which latter is of the disk type, and said seats are disposed between the points where hot and cold water ports 10 and 11 open for communication with said chamber and the point where the discharge port 14 communicates with said chamber, whereby the ports 10 and 11 are simultaneously brought into and shut off from communication with the discharge port 14.

An important provision in connection with the valve C is that when the plug valve B is set to simultaneously admit hot and cold water into the ports 10 and 11 respectively and the discharge valve C is closed, the hot water in port 10 is prevented from backing up into the cold water line through the cold water port 11 and the cold water in the port 11 is likewise prevented from backing up into the hot water line through the hot water port 10. This separation is accomplished by means of the tubular seat member 23 which is concentric with and circumferentially spaced from the seat 22 and has its seat end flush with the seat end of the member 22 and its opposite end exclusively in communication with the upper end of the hot water port 10. Thus the hot water must pass through the tubular seat member 23 to enter chamber 12 while the cold water passes directly into the annular chamber space defined between the concentric seat members 22 and 23 and as valve C simultaneously closes against these seat members the two fluids cannot mix until the valve C is opened and the fluids are allowed free flow to the discharge port 14 as clearly shown in Figure 1. The seat members 22 and 23 may, as here shown, be press-fitted and thus held in suitable counterbores therefor in the chamber 12.

The handle-operating means D which is common to the valves B and C includes an integral tubular lateral handle extension 24 of the plug valve B and pistol-grip handle portion 25 telescopically mounted on the extension 24 so as to rotate about the longitudinal axis of the latter and move axially thereof. This rotary pistol-grip portion of the handle assembly has the outer end of a valve stem 26 screwed into a bore 27 therein and fixed thereto by means of a set screw 28, said stem extending into the tubular extension 24 and carrying the valve C on its inner end. An enlarged screw threaded portion 29 of the stem 26 cooperates with internal screw threads 30 in the extension 24 so that on rotating the pistol-grip 25, the valve C will be moved axially with the grip and stem 26 whereby to move said valve into and out of engagement with its two seats 22 and 23.

In the present embodiment of this invention the handle D is moved progressively from the off position shown in full lines in Figures 3 to the right in order to set the valve in the "cold water" position shown in Figure 6, the hot and cold mixture position shown in Figure 7 and the hot water position shown in Figure 8, the dotted showing of the handle, Figure 3, being the "hot water" position thereof. The quality of flow may be varied, as is obvious, by varying the degree of registration of the body and plug valve ports.

It is now seen that the handle D as a whole including the pistol-grip portion 25 may be moved to the right to set the plug selector B into any one or in between the three positions shown in Figures 6, 7 and 8 respectively, whereby either hot or cold water or any desired admixture thereof may be obtained, and that unless the pistol-grip 25 is turned on its axis to open the valve C (valve C being closed when the grip 25 is in down-turned position) the valve C in being closed, will prevent flow of the selected liquid or mixed liquids from the faucet. The friction set up by the plug valve is sufficient to hold it in selected position.

When discharge of the hot or cold water or the mixture thereof, as the case may be, is desired the operator turns the pistol-grip 25 on its axis so as to "screw out" the stem 26 and move the valve C off the seats 22 and 23, thus allowing the selected liquid or the mixed liquids to flow through the discharge passage 14 and the spout 15. The turning of the pistol-grip and resultant unseating of valve C may be effected by the operator while also using said grip to move the handle assembly D as a whole and the selector valve B to a desired position. In this way the selection and discharge of liquid may be made substantially simultaneously but of course these operations may be sequential with either valve being first opened. In all events it is unnecessary for the operator to remove or change grip on the handle assembly.

As shown in Figures 2 and 5 also in Figures 6, 7 and 8 the plug valve B is cut away or notched as at 31 on one side of the entrance of the port 11 to widen this port and provide graduated registration of ports 11 and 9 and a more gradual shutting off of the cold water during the change-over from cold to all-hot water to eliminate sudden scalding flow.

In the modified form of plug valve shown in Figures 4 and 9 to 12 inclusive, the body and plug valve ports are so relatively arranged that the handle assembly D' moves to right and left of the center or "off" position, Figures 2 and 9, to provide the changes of desired flow. In this form the valve body 32 has the cold water ports 33 and 34, the latter serving the same purpose as above described for the notch 31. Referring to Figures 4 and 9 it is seen that with the valve handle in the center, (full line) position the plug ports 35 and 36 are closed to all body ports. Movement of the handle to the "right" dotted line position (Figure 4) registers ports 35 and 33, Figure 10, defining, for example, the cold water flow. Return of the handle to center, full line position Figure 4, closes all ports, whereas movement of the handle to the "left" dotted line position (Figure 4) progressively registers ports 35 and 34, Figure 11, of the cold water side and 36 and 37 of the hot water side for a graduated mixture flow. Upon continued movement of the handle to the left, port 35 is closed relative to ports 33 and 34 and ports 36 and 37 (Figure 12) fully registered, whereupon hot water only is permitted to flow. The hot water port 37 in the body, the cold water port 33 and the plug selector-valve ports 35 and 36 as well as the discharge port 38 therein and all other parts or elements of this modified form are the same as corresponding parts and elements in the first described form.

We claim:

1. In a faucet valve, a valve body having a bore extending therethrough and provided with separate ports, a discharge nozzle connected with said body, a rotary plug valve seated in said bore with its inner end projecting therefrom into said nozzle and its outer end projecting first upwardly and then angularly outward from said bore and body, said plug valve having separate substantially parallel inlet ports extending longitudinally thereof with their inner ends opening laterally thereon for registration with the ports in said valve body, there being a discharge port extending longitudinally in said plug valve with its outer end in communication with the outer ends of said inlet ports, and its inner end opening through the inner end of the plug valve into said nozzle, a discharge valve at the juncture of said inlet and discharge ports for controlling communication therebetween, a handle mounted on and movable with the outer end of the plug valve to operate the plug valve, also movable relative to the plug valve for actuating the discharge valve, and means responsive to said relative movement of said handle for opening and closing said discharge valve.

2. In a faucet valve, a valve body having a bore extending therethrough, a threaded nipple on the body, a discharge nozzle threaded onto said nipple, a rotary plug valve seated in said bore with one end projecting into said nipple, spring means associated with said end of said valve and said body for holding said valve seated in said bore, said body having separate ports and said valve having separate inlet ports for registration with said ports in the body, said plug valve also having a discharge port one end of which communicates with the separate inlet ports and the other end of which opens through said end of the plug valve into said nozzle, a discharge valve at the juncture of said inlet and discharge ports for simultaneously opening and closing said inlet ports, and means carried by said plug valve for selectively operating the plug valve and the discharge valve.

3. In a faucet valve, a valve body having a bore extending therethrough and provided with separate ports, a discharge nozzle connected with said body, a rotary plug valve seated in said bore with its inner end projecting therefrom into said nozzle and its outer end projecting first upwardly and then angularly outward from said bore and body, said plug valve having separate substantially parallel inlet ports extending longitudinally thereof with their inner ends opening laterally thereon for registration with the ports in said valve body, there being a discharge port extending longitudinally in said plug valve with its outer end in communication with the outer ends of said inlet ports, and its inner end opening through the inner end of the plug valve into said nozzle, a discharge valve at the juncture of said inlet and discharge ports for controlling communication therebetween, said angularly extended portion of said plug valve having a screw threaded bore extended therethrough to said discharge port, a screw threaded valve stem connected with said discharge valve and operable in said screw threaded bore for opening and closing said discharge valve, means for sealing the outer end of said screw threaded bore, and a handle fixed to said stem and selectively operable on said angular portion of the plug valve for rotating the stem and said plug valve.

WILLIAM A. HERRING.
REX D. BARNETT.